United States Patent
Brunner

(10) Patent No.: US 8,555,915 B2
(45) Date of Patent: Oct. 15, 2013

(54) DUAL ACTION LOW HEAD ISOLATION VALVE

(76) Inventor: Richard A. Brunner, Coatesville, PA (US)

(*) Notice: Subject to any disclaimer, the term of this patent is extended or adjusted under 35 U.S.C. 154(b) by 611 days.

(21) Appl. No.: 12/491,632

(22) Filed: Jun. 25, 2009

(65) Prior Publication Data

US 2009/0320936 A1 Dec. 31, 2009

Related U.S. Application Data

(60) Provisional application No. 61/132,917, filed on Jun. 25, 2008.

(51) Int. Cl.
*F16K 17/26* (2006.01)

(52) U.S. Cl.
USPC ............... 137/493.8; 137/526; 137/533.11; 251/338; 251/368

(58) Field of Classification Search
USPC ........ 137/241.21, 247.23, 493–543; 251/247, 251/338, 356, 368
See application file for complete search history.

(56) References Cited

U.S. PATENT DOCUMENTS

| | | | | |
|---|---|---|---|---|
| 1,138,551 A | * | 5/1915 | Gebhardt | 137/493.8 |
| 1,363,732 A | * | 12/1920 | Heidmann | 137/247.21 |
| 1,669,739 A | * | 5/1928 | Clark | 137/493.8 |
| 2,526,019 A | * | 10/1950 | Douglas | 137/859 |
| 4,007,759 A | * | 2/1977 | Martin et al. | 137/550 |
| 4,535,800 A | | 8/1985 | Leech | 137/205 |
| 4,834,036 A | * | 5/1989 | Nishiyama et al. | 123/188.2 |
| 4,960,262 A | * | 10/1990 | Hashimoto et al. | 251/315.1 |
| 5,822,807 A | * | 10/1998 | Gallagher et al. | 4/507 |
| 6,234,198 B1 | * | 5/2001 | Chalich | 137/526 |
| 7,140,388 B2 | * | 11/2006 | Chalich | 137/526 |
| 2003/0024571 A1 | * | 2/2003 | Simmons et al. | 137/329.05 |
| 2006/0065316 A1 | * | 3/2006 | Horton | 137/846 |
| 2006/0201557 A1 | * | 9/2006 | Shieh | 137/533.11 |

FOREIGN PATENT DOCUMENTS

WO    WO 2008048122 A1   *   4/2008

* cited by examiner

*Primary Examiner* — Craig Schneider
*Assistant Examiner* — Jessica Cahill
(74) *Attorney, Agent, or Firm* — Cozen O'Connor

(57) ABSTRACT

A Dual Action, Low Head Isolation Valve is a plumbing fitting that will isolate the interior pipes of a house from the exterior temperatures of summer and winter while allowing the passage of gasses through the system for venting. This valve would be installed at the top of the household plumbing drainage system, or the top vent, in the attic or above the roof. This valve will allow for the system to draw in air and exhaust the septic gasses, or respirate in both directions with very low head or resistance.

14 Claims, 5 Drawing Sheets

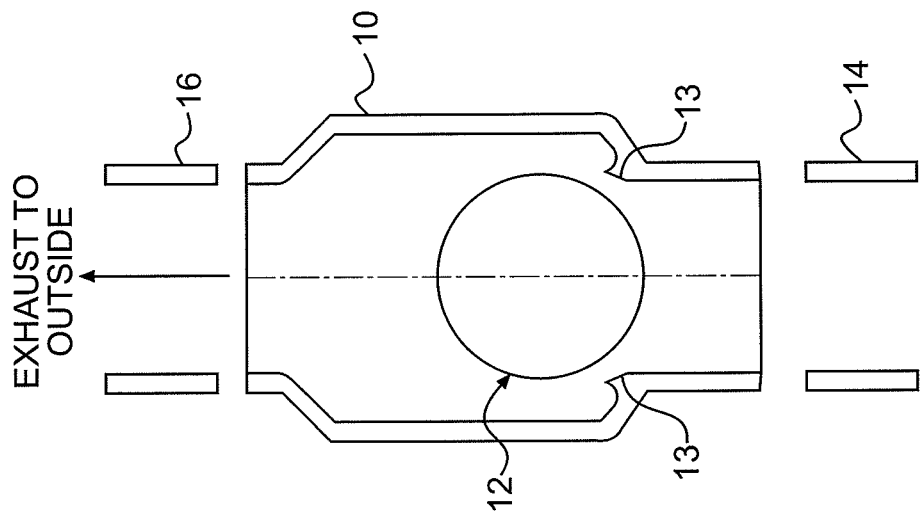

DUAL ACTION LOW HEAD ISOLATION VALVE

PRIORITY

This application claims benefit of provisional patent application 61/132,917, filed Jun. 25, 2008.

FIELD OF THE INVENTION

The present invention generally relates to a Dual Action, Low Head Isolation Valve. The valve is a plumbing fitting that will isolate the interior pipes of a house from the exterior temperatures of summer and winter while allowing the passage of gasses through the system for venting. This valve would be installed at the top of the household plumbing drainage system, or the top vent, in the attic or above the roof. This valve will allow for the system to draw in air and exhaust the septic gasses, or respirate in both directions with very low head or resistance.

BACKGROUND OF THE INVENTION

A building's waste-disposal system has two parts: the drainage system and the venting system. The drainage system, also called traps and drains, comprises pipes leading from various plumbing fixtures to the building drain (indoors) and then the building sewer (outdoors). The building sewer is then connected to a municipal sanitary sewage disposal system. Where connection to a municipal sewage system is not possible, a local, private, code-approved septic system is required.

The venting system, also called plumbing vents, consists of pipes leading from fixtures to the outdoors, usually via the roof. Vents provide for relief of sewer gases, admission of oxygen for aerobic sewage digestion, and maintenance of the trap water seals which prevent sewer gases from entering the building. Every fixture is required to have an internal or external trap; double trapping is prohibited by plumbing codes. With exceptions, every plumbing fixture must have an attached vent. The top of stacks must be vented too, via a stack vent also called stink pipe.

Plumbing drainage and venting systems maintain neutral air pressure in the drains, allowing flow of water and sewage down drains and through waste pipes by gravity. As such, it is critical that a downward slope be maintained throughout. In relatively rare situations, a downward slope out of a building to the sewer cannot be created, and a special collection pit and grinding lift 'sewage ejector' pump are needed. By comparison, potable water supply systems operate under pressure to distribute water up through buildings.

A sewer pipe is normally at neutral air pressure compared to the surrounding atmosphere. When a column of waste water flows through a pipe, it compresses air in the pipe, creating a positive pressure that must be released or it will push back on the waste stream and downstream traps' water seals. As the column of water passes, air must flow in behind the waste stream or negative pressure (suction) results. The extent of these pressure fluctuations is determined by the fluid volume of the waste discharge.

Excessive negative air pressure, behind a 'slug' of water that is draining, can siphon water from trap seals at plumbing fixtures. Generally, a toilet outlet has the shortest trap seal, making it most vulnerable to being emptied by induced siphonage. An empty trap can allow noxious sewer gasses to enter a building.

On the other hand, if the air pressure within the drain becomes suddenly higher than ambient, this positive transient could cause waste water to be pushed into the fixture, breaking the trap seal, with dire hygiene and health consequences if too forceful.

Most residential buildings' drainage systems in North America are vented directly through the buildings' roofs. The drainage, waste, and vent (DWV) pipe is typically acrylonitrile butadiene styrene (ABS) or Poly(chloroethanediyl)) (PVC) and is DWV rated plastic pipe equipped with a flashing to prevent water entering the buildings. Older homes may use copper, iron, lead or clay pipes, in rough order of increasing antiquity.

Under many older building codes, a vent stack, a pipe leading to the main roof vent, is required to be within a five foot radius of the draining fixture (sink, toilet, shower stall, etc.). To allow only one vent stack, and thus one roof protrusion as permitted by local building code, sub-vents may be tied together and exit a common vent stack.

A blocked vent is a relatively common problem caused by anything from leaves, to dead squirrels, to ice dams in very cold weather. Symptoms range from bubbles in the toilet bowl when it is flushed, to slow drainage, and all the way to siphoned (empty) traps and sewer gases entering the building.

It is therefore desirable to have a dual action, low head isolation valve to permit venting in a plumbing system. This plumbing fitting will isolate the interior pipes of a house from the exterior temperatures of summer and winter while allowing the passage of gasses through the system for venting. This valve would be installed at the top of the household plumbing drainage system, or the top vent, in the attic or above the roof. This valve will allow for the system to draw in air and exhaust the septic gasses, or respirate in both directions with very low head or resistance.

SUMMARY OF THE INVENTION

The foregoing needs are met, to a great extent, by the present invention. In one aspect, the present invention provides a dual action low head isolation valve for venting gasses in a plumbing system. The valve is made from a valve body with a ball seat valve located on a input side and a first ball inside of said valve body which is engaged with said valve seat when there is no pressure differential between said input side and an output side.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

In order that the invention may more readily be understood, reference is directed to the accompanying drawings.

FIG. 1 is an illustration of a float ball isolator valve of an embodiment of the present invention.

DETAILED DESCRIPTION

Figure 3:
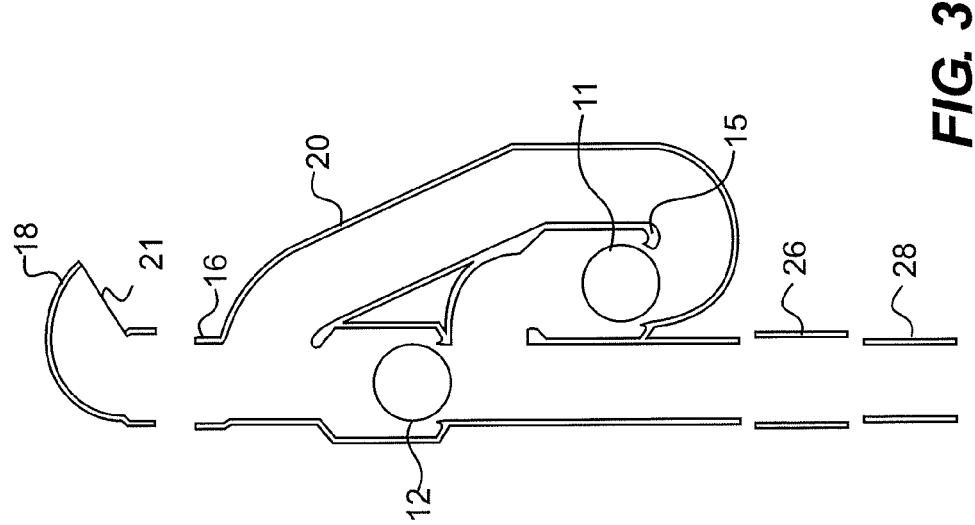
FIG. 3 is an illustration of a dual float ball isolator valve of an embodiment of the present invention intended for old work retrofitting.

Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

FIG. 1 illustrates a first embodiment of the present invention. A valve 10 contains a ball 12. The entry end 14 of the valve attaches to the buildings plumbing and the exit end 16 attaches to the vent stack to the outside. When there is no pressure differential between the building's plumbing and the outside, the ball 12 rest on the valve seat 13. When the pressure in the house's plumbing increases, the ball 12 lifts, expressing the built up gas.

In a preferred embodiment, the ball 10 can be made out of acrylonitrile butadiene styrene (ABS). Additionally, the ball 10 can be made of Poly(chloroethanediyl)) (PVC), polytetrafluoroethylene (PTFE), which is sold under the trademark "Teflon," or any other suitable material. The ball's size, and more particularly the weight are critical. The size of the ball is related to the diameter of the vent pipe and the pressure of the gas the valve needs to express. The ball's weight can be calibrated by changing the thickness of the ball's skin, injecting a gas, like helium to make it lighter, or injecting a weight to make the ball heavier. The geographic location and climate of the venting system will also play an important factor when determining the weight of the ball.

Figure 2:
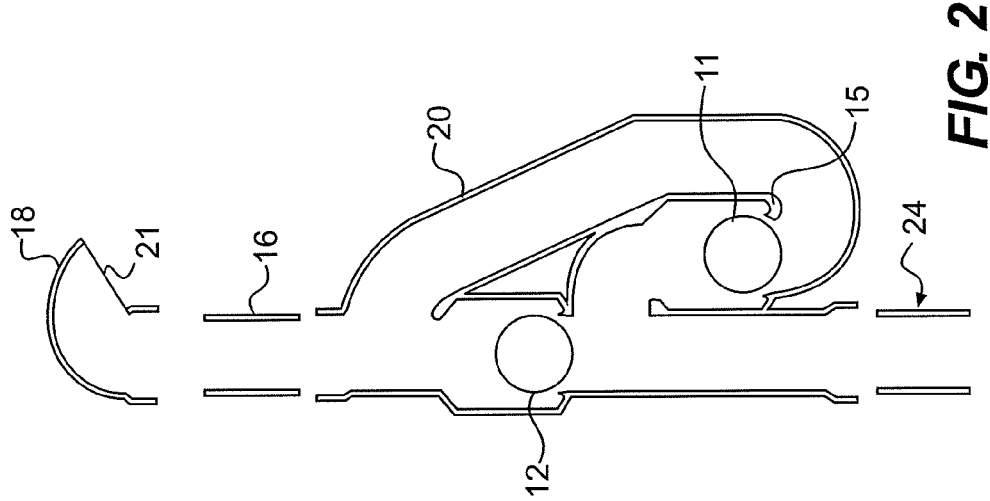
FIG. 2 is an illustration of a dual float ball isolator valve of an embodiment of the present invention intended for new construction.

FIGS. 2 and 3 illustrate an embodiment which will allow for the system to draw in air and exhaust the septic gasses, or respirate in both directions with very low head or resistance. This dual action function can be accomplished through the use of gates, flappers, or with variable weight balls as in a snorkel. A snorkel will operate perfectly for the system in one direction only. A dual action system requires another snorkel to operate in an inverted position to operate for the reverse pressure flow. This basic example utilizes two snorkel type gates or isolators, with hollow balls that act as valves while at rest, and lift to allow for the passage of air or gas in either direction. This configuration will gently seal the system from the exterior temperatures to improve the energy efficiency of the home by eliminating the heat loss through direct exposure of the interior plumbing system. This system also has another dual action as it works in the summer against heat gain and during the winter against heat loss. The standard household roof vent line for the plumbing drainage system is a 4" diameter pipe that is constantly allowing the exterior temperatures of winter into the home through out the whole system. This results in colder bathrooms, walls, and higher heating bills. This isolator valve will correct this problem and save on energy costs of household heating.

The ideal placement of the valve is within a building towards the building roof. But, alternatively, the valve can be place lower in the building or even on the roof.

A second ball 11 and second valve seat 15 is employed with a snorkel appendage 20 to permit fresh air to enter the buildings plumbing system. A cap 18 may also be employed to keep rain and snow out of the vent system. A screen 21 material is placed at the open end of the cap 18 to keep objects, such as bugs, insects and other things out of the vent system. Additionally, FIG. 2 is for new construction and attaches directly to the PVC vent pipe 24. FIG. 3 is for old work (retrofit) and includes flange 26 to interface with the existing roof vent pipe 28.

Figure 4:
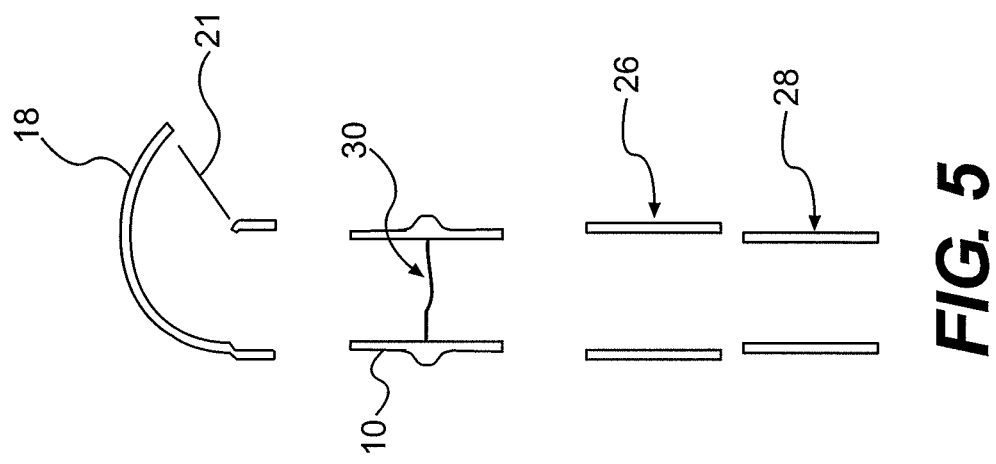
FIG. 4 an illustration of a membrane isolator valve of an embodiment of the present invention intended for new construction.
Figure 5:
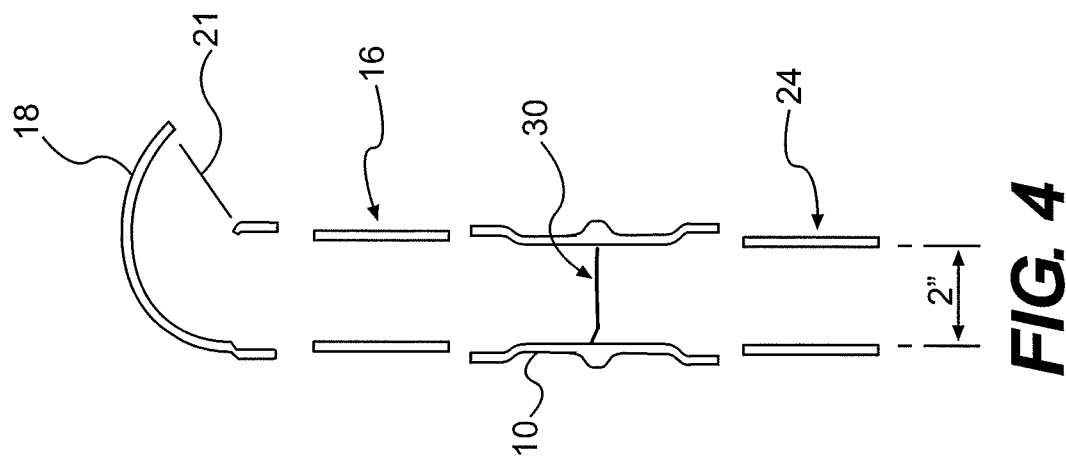
FIG. 5 is an illustration of a membrane isolator valve of an embodiment of the present invention intended for old work retrofitting.

FIG. 4 shows an additional embodiment in which a membrane 30 is placed inside the valve body 10. The membrane 30 is permeable in which it will allow certain molecules or ions to pass through it by diffusion and occasionally specialized "facilitated diffusion." The rate of passage depends on the pressure, concentration, and temperature of the molecules or solutes on either side, as well as the permeability of the membrane to each solute. Depending on the membrane and the solute, permeability may depend on solute size, solubility, properties, or chemistry. In this embodiment, the "sewer gas" is permitted to vent to the outside, while allowing fresh air in. FIG. 4 illustrates the present invention for new construction and attaches directly to the PVC vent pipe 24. FIG. 5 is for old work (retrofit) and includes flange 26 to interface with the existing roof vent pipe 28.

Figure 7:
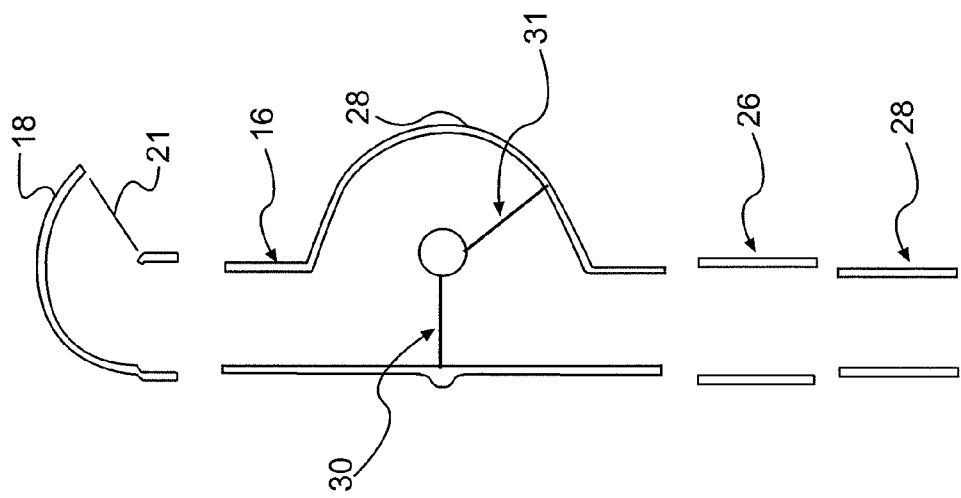
FIG. 7 is an illustration of a dual membrane isolator valve of an embodiment of the present invention intended for old work retrofitting.
Figure 6:
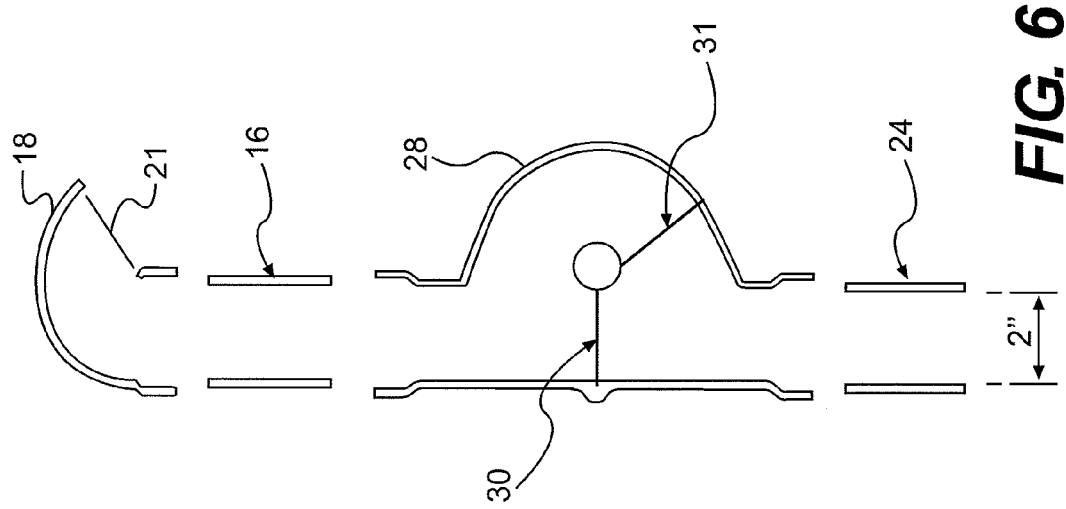
FIG. 6 is an illustration of a dual membrane isolator valve of an embodiment of the present invention intended for new construction.

FIG. 6 shows an additional embodiment in which a membrane 30 is placed inside the circular valve body 28. The membrane 30 is permeable in which it will allow certain molecules or ions to pass through it by diffusion and occasionally specialized "facilitated diffusion." The rate of passage depends on the pressure, concentration, and temperature of the molecules or solutes on either side, as well as the permeability of the membrane to each solute. Depending on the membrane and the solute, permeability may depend on solute size, solubility, properties, or chemistry. In this embodiment, the "sewer gas" is permitted to vent to the outside though membrane 30, while allowing fresh air in via membrane 31. FIG. 6 illustrates the present invention for new construction and attaches directly to the PVC vent pipe 24. FIG. 7 is for old work (retrofit) and includes flange 26 to interface with the existing roof vent pipe 28.

Figure 8:
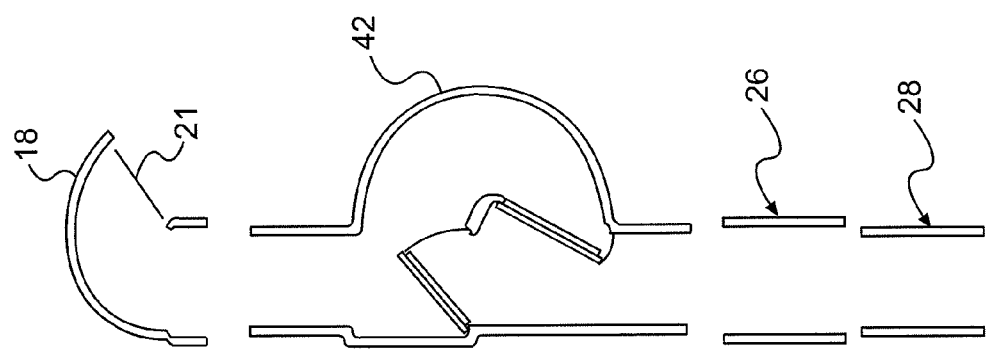
FIG. 8 is an illustration of a dual date isolator valve of an embodiment of the present invention intended for new construction.
Figure 9:
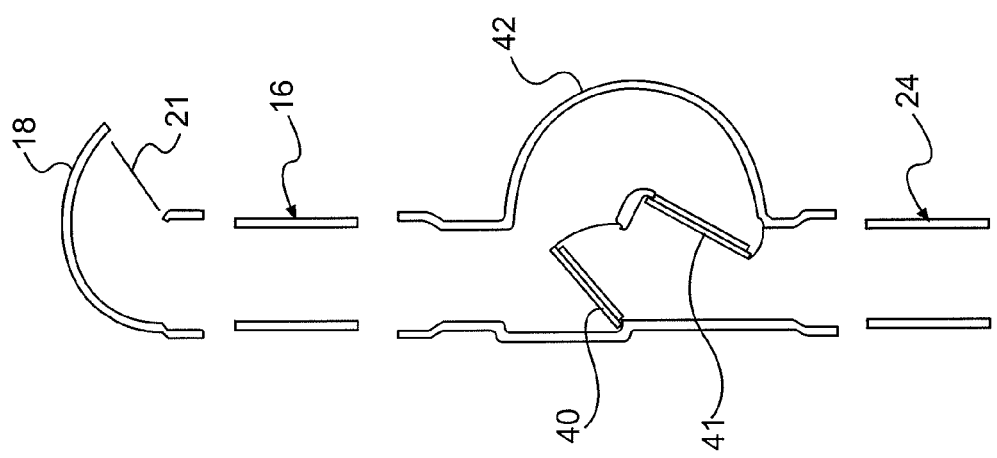
FIG. 9 is an illustration of a dual gate isolator valve of an embodiment of the present invention intended for old work retrofitting.

FIG. 8 shows an additional embodiment in which a first flapper 40 is placed inside the flapper valve body 42. The first flapper 40 permits the "sewer gas" to vent to the outside and a second flapper 41 allows fresh air into the plumbing system. FIG. 8 illustrates the present invention for new construction and attaches directly to the PVC vent pipe 24. FIG. 9 is for old work (retrofit) and includes flange 26 to interface with the existing roof vent pipe 28.

Finally, it is to be understood that various alterations, modifications and/or additions may be introduced into the constructions and arrangements of parts previously described without departing from the spirit or ambit of the invention.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A dual action low head isolation valve for venting gasses in a plumbing system, the valve comprising:
    a valve body with a ball valve seat located on an input side of the valve;
    a first ball positioned in said valve body, the first ball being engaged with said valve seat when there is no pressure differential between said input side and an output side of the valve, wherein the first ball is configured to maintain a seal at the valve seat when a pressure inside the plumbing system is less than or equal to an outside ambient pressure and the first ball is configured to lift from the valve seat to vent gas to the outside when the pressure inside the plumbing system is greater than the outside ambient pressure; and
    a second ball and a second ball valve seat positioned in a fresh air pipe which is arranged in parallel with the valve body, whereby said second ball permits fresh air to ingress into the plumbing system, wherein the second ball is configured to maintain a seal at the valve seat when the pressure inside the plumbing system is greater than or equal to the outside ambient pressure and the second ball is configured to lift from the valve seat to permit fresh air inside the plumbing system when the pressure inside the plumbing system is less than the outside ambient pressure,
    wherein the first ball is housed in a first cylindrical housing and the second ball is housed in a second cylindrical housing, each of the first and second cylindrical housings having a valve seat at a lower end thereof upon which the first and second balls, respectively, seat,
    the first cylindrical housing is connected at both ends to input pipes of lesser diameter than a diameter of the first cylindrical housing, and the second cylindrical housing is connected at both ends to input pipes of lesser diameter than a diameter of the second cylindrical housing,
    longitudinal axes of the first and second cylindrical housings are oriented parallel to one another and adjacent to one another, and the second cylindrical housing is connected, via connecting pipes, including at least a first connecting pipe and a second connecting pipe, to the input pipes of the first cylindrical housing, and
    an upper end of the second cylindrical housing is connected to the input pipe at the lower end of the first cylindrical housing by the first connecting pipe and the lower end of the second cylindrical housing is connected to the input pipe at the upper end of the first cylindrical housing via the second connecting pipe.

2. The dual action low head isolation valve for venting gasses of claim 1 in which the first and second balls comprise acrylonitrile butadiene styrene (ABS) or Poly(chloroethanediyl)) (PVC).

3. The dual action low head isolation valve for venting gasses of claim 1 in which the valve body is made out of drainage, waste, and vent (DWV) acrylonitrile butadiene styrene (ABS).

4. The dual action low head isolation valve for venting gasses of claim 1 in which the valve body is made out of drainage, waste, and vent (DWV) Poly(chloroethanediyl)) (PVC).

5. The dual action low head isolation valve for venting gasses in a plumbing system of claim 1, in which the dual action low head isolation valve is coupled directly to a vent pipe.

6. The dual action low head isolation valve for venting gasses in a plumbing system of claim 1, in which the dual action low head isolation valve is coupled to a vent pipe via a flange.

7. The dual action low head isolation valve for venting gasses in a plumbing system of claim 1 in which a cap is placed on top of said dual action low head isolation valve top to keep rain and snow out of the plumbing system.

8. The dual action low head isolation valve for venting gasses in a plumbing system of claim 1, in which a screen is placed on top of said dual action low head isolation valve keep insects and debris out of the plumbing system.

9. The dual action low head isolation valve for venting gasses in a plumbing system of claim 1, in which a weight of the first ball and a weight of the second ball are determined for a specific geographical location.

10. The dual action low head isolation valve for venting gasses in a plumbing system of claim 1, in which a weight of the first ball and a weight of the second ball are determined by an amount of gas pressure needed to be expressed to the outside.

11. The dual action low head isolation valve for venting gasses in a plumbing system of claim 1, in which a weight of the first ball and a weight of the second ball are decreased by injecting helium into the first and second balls.

12. The dual action low head isolation valve for venting gasses in a plumbing system of claim 1, wherein the first cylindrical housing is configured to be installed in line with a drain vent pipe.

13. The dual action low head isolation valve for venting gasses in a plumbing system of claim 1, wherein the second connecting pipe is longer than the first connecting pipe.

14. The dual action low head isolation valve for venting gasses in a plumbing system of claim 1, in which a size of the first ball and a size of the second ball relative, respectively, to a size of the first and second cylindrical housings are determined by an amount of gas pressure needed to be expressed to the outside.

* * * * *